Giichi Onuma
Takaomi Kurokouchi
INVENTORS
BY George B. Oujevolk
Attorney

FIG. 3A
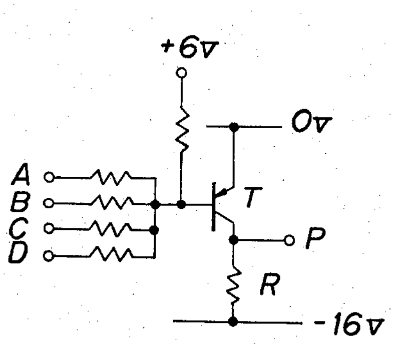
FIG. 3B
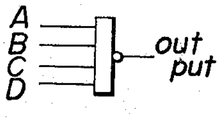
FIG. 3C
| A | B | out put |
|---|---|---|
| 0 | 0 | 1 |
| 1 | 0 | 0 |
| 0 | 1 | 0 |
| 1 | 1 | 0 |
FIG. 4
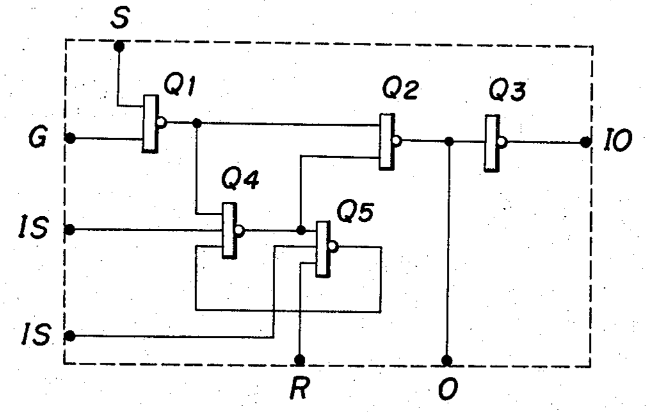
FIG. 5
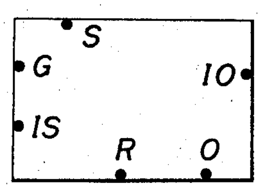
Giichi Onuma
Takaomi Kurokouchi
INVENTORS
BY George B. Oujevolk
Attorney Giichi Onuma
Takaomi Kurokouchi
INVENTORS BY George B. Oujevolk
Attorney Giichi Onuma
Takaomi Kurokouchi
INVENTORS BY George B. Oujevolk
Attorney INVENTORS
Giichi Onuma
Takaomi Kurokouchi
BY
George B. Oujevolk
Attorney Giichi Onuma
Takaomi Kurokouchi
INVENTORS BY George B. Oujevolk
Attorney Giichi Onuma
Takami Kurokouchi
INVENTORS BY George B. Oujevolk
Attorney Giichi Onuma
Takaomi Kurokouchi
INVENTORS BY George B. Oujevolk
Attorney Giichi Onuma
Takaomi Kurokouchi
INVENTORS BY George B. Oujevolk
Attorney

United States Patent Office 3,371,221

Patented Feb. 27, 1968

3,371,221

SHIFT REGISTER USING CASCADED NOR CIRCUITS WITH FORWARD FEED FROM PRECEDING TO SUCCEEDING STAGES

Giichi Onuma and Takaomi Kurokouchi, Tokyo, Japan, assignors to Tokyo Shibaura Electric Co., Ltd., Kawasaki-shi, Japan, a corporation of Japan Filed Dec. 30, 1964, Ser. No. 422,387

2 Claims. (Cl. 307—221)

ABSTRACT OF THE DISCLOSURE

A shift register wherein conventional flip-flops are replaced by cascaded NOR circuits with forward feed from preceding to succeeding circuits and feedback from each succeeding to the preceding circuit.

This invention relates to an improved shift register circuit and more particularly to a shaft register circuit comprising a plurality of NOR circuits, and which operates with stability although at relatively low speeds.

Various types of electronic computers, digital control apparatus, and the like are equipped with switching circuits or sequences. Usually such a switching circuit comprises a plurality of cascaded binary memory element stages which can provide two states of memory, i.e., "0" and "1" or ON and OFF and which are so constructed that there is always one memory element having a particular memory state different from the states of the remaining memory elements and that said particular state of memory is shifted to successive stages according to shift pulses impressed as the input signals.

Conventional shift registers usually have a kind of flip-flop circuit including, for instance, a pair of PNP transistor. Shift pulses are applied to the base electrodes of these transistors through suitable condensers. While such a shift register is advantageous in that its operating speed is high and it is highly sensitive to input signals, it is liable to mulfunction or misoperate due to the presence of electrical noise.

It is therefore an object of this invention to provide an improved shift register circuit which is free from any misoperation caused by electrical noise.

Briefly stated the shift register of this invention comprises a first NOR circuit constructed such that it will provide an output in response to a control input pulse when the circuit element of a preceding stage is in one state of operation but will not provide any output in response to said control input pulse when said circuit element of said preceding stage is in the other state, a second NOR circuit operative to store the output from said first NOR circuit and to continue to provide an output until reset subsequently and a third NOR circuit operative to provide an output in response to the outputs from said first and second NOR circuits when said input pulse has ceased. There is also provided a fourth NOR circuit which operates to invert the output from said first NOR circuit to provide an output only during the interval in which said input pulse is being impressed.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawings, in which FIG. 1 shows a block connection diagram of a conventional switching circuit;

FIG. 2 is a connection diagram illustrating one example of a conventional shift register circuit constituting the respective blocks shown in FIG. 1;

FIGS. 3(A), 3(B), 3(C) represent a connection diagram of a NOR circuit utilized in this invention and an operation chart;

FIG. 4 shows one embodiment of a shift register circuit constructed in accordance with the principle of this invention;

FIG. 5 shows a block diagram wherein FIG. 4 is encoded;

Figure 8:
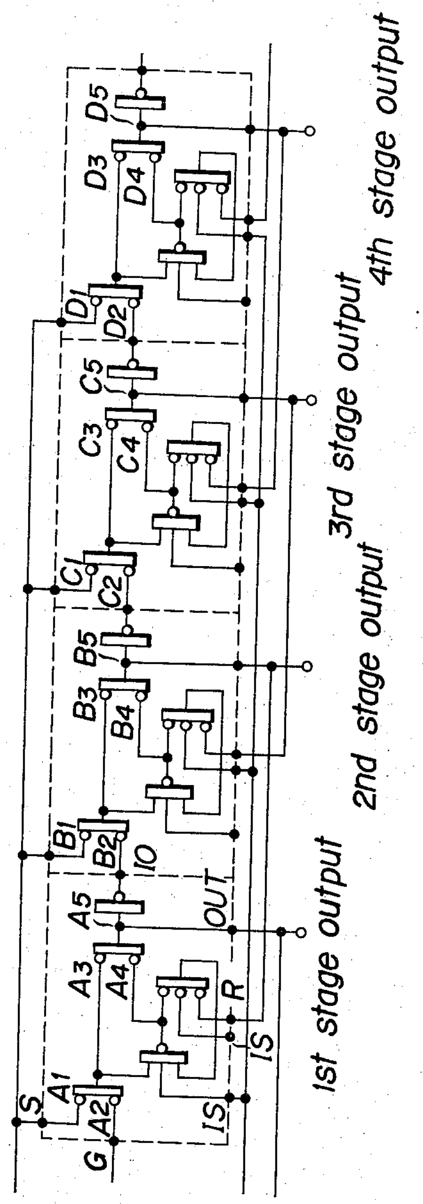
Figure 8:
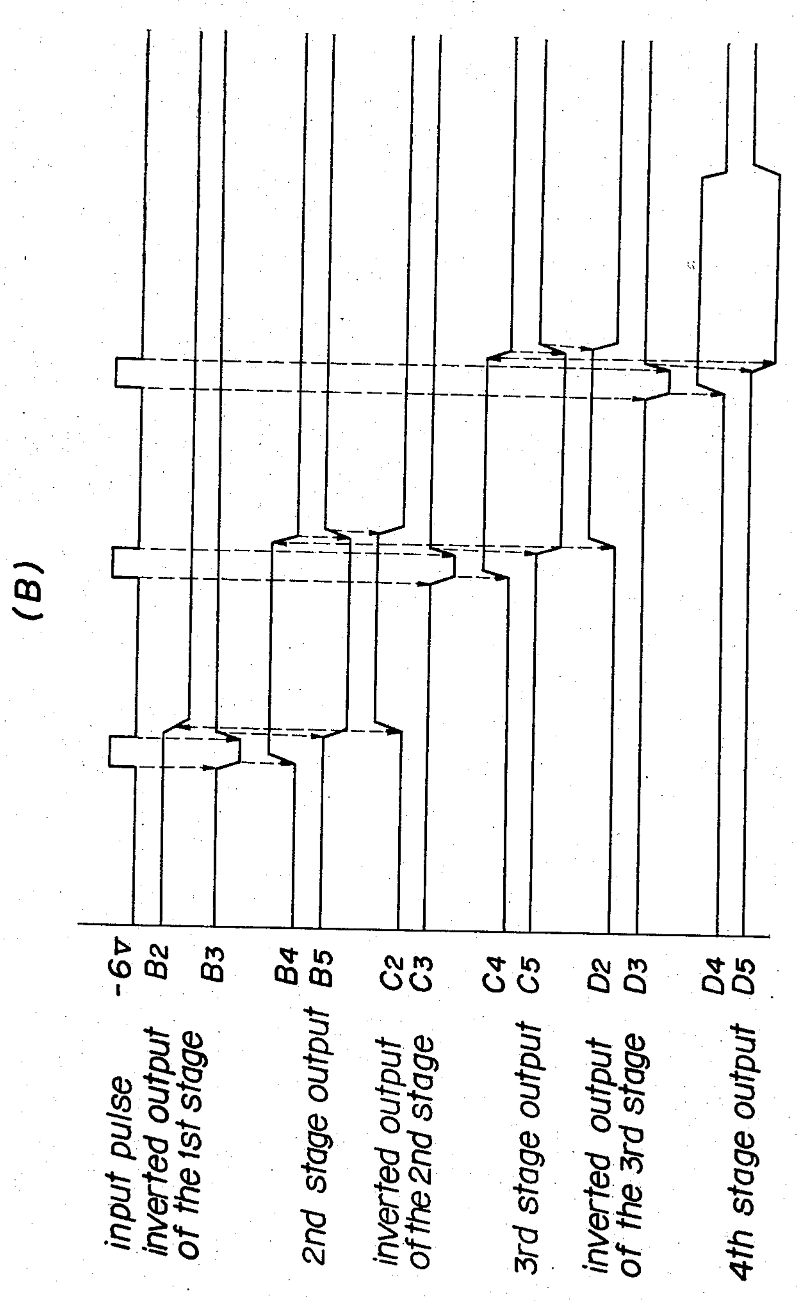
Figures 9, 11:
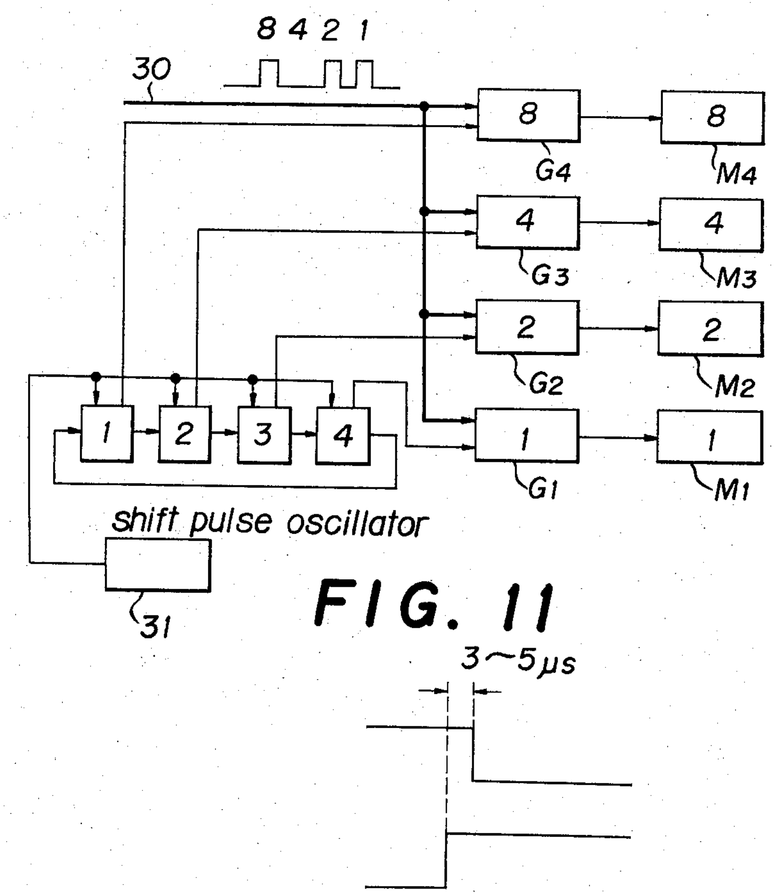
Figure 10A:
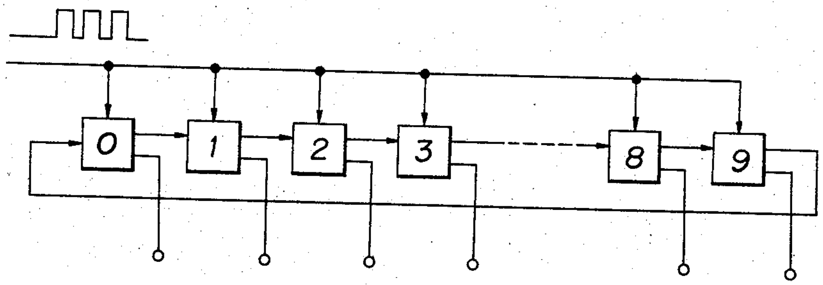
Figure 10B:
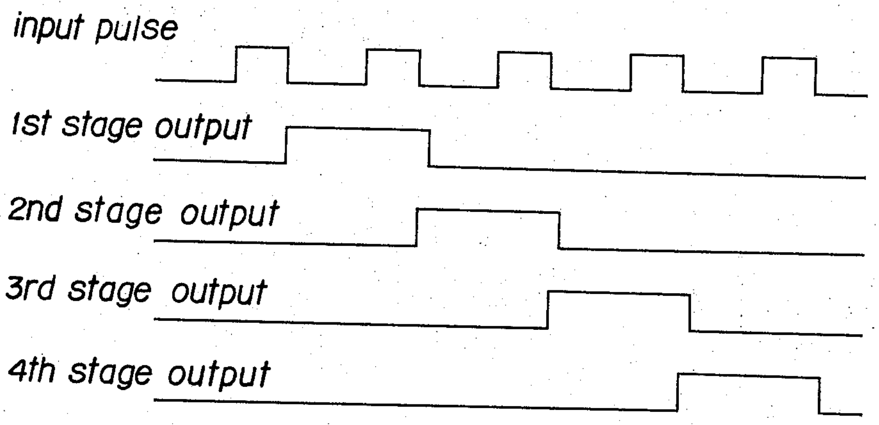
Figure 12:
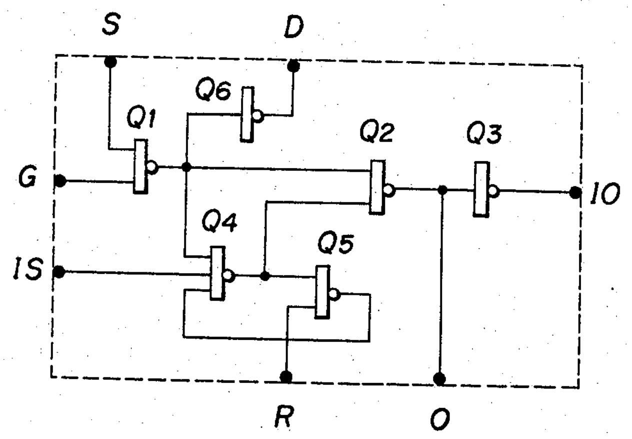
Figure 13:
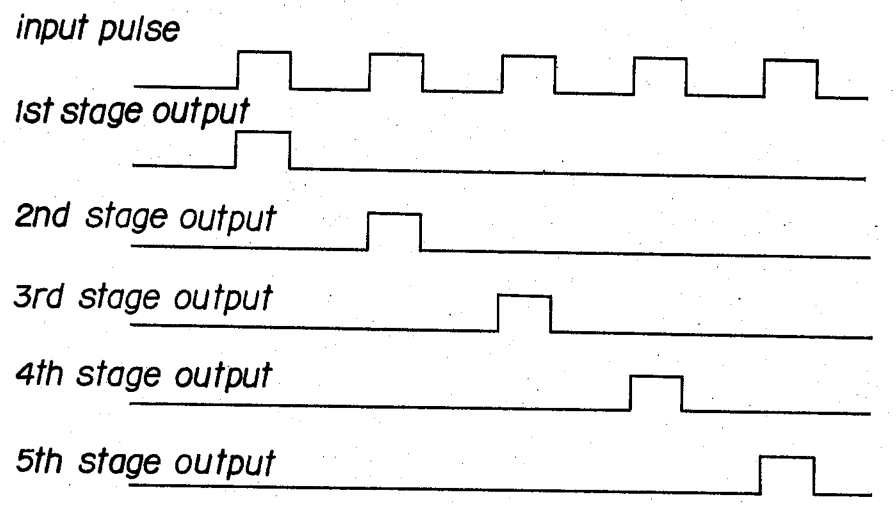
Figure 14:
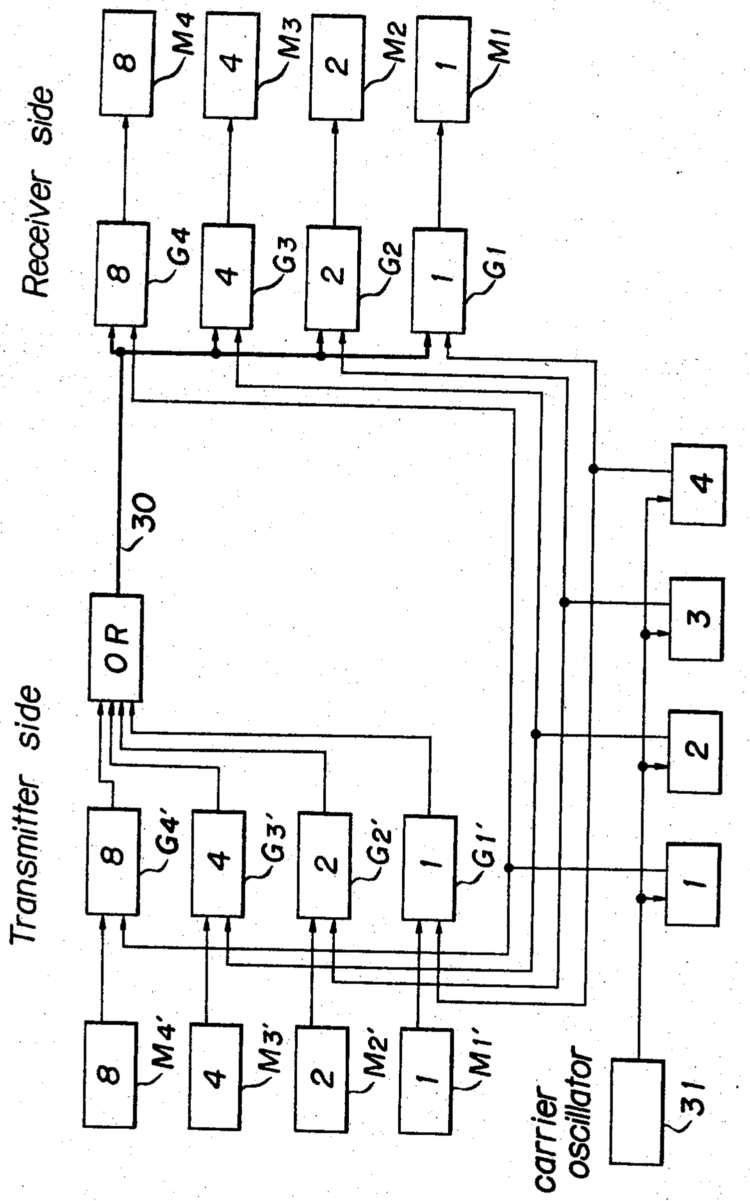

FIGS. 8(A), 8(B) show the detail of connection of the switching circuit and various curves to explain the operation thereof;

FIG. 9 shows a block diagram illustrating one application of this invention;

FIGS. 10(A), 10(B) show a block diagram of a switching circuit of this invention together with curves to explain the operation thereof;

FIG. 11 is an enlarged view of a portion of the curve shown in FIG. 10;

FIG. 12 is a connection diagram illustrating a modified embodiment of this invention;

FIG. 13 shows various curves to explain the operation of the embodiment shown in FIG. 12; and FIG. 14 is a circuit diagram of another application of this invention.

Figure 1:
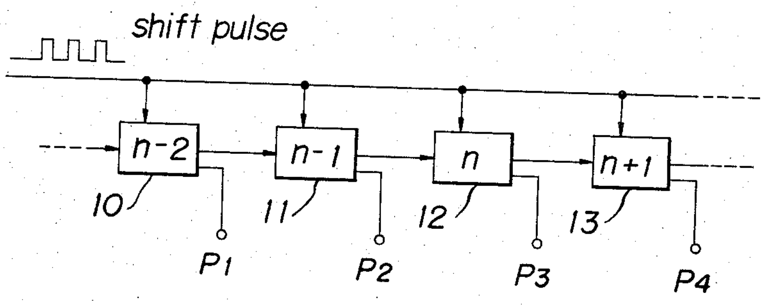
FIG. 1 PRIOR ART

Referring now to FIG. 1 which shows a conventional switching circuit comprising a plurality of cascade connected binary memory elements 10, 11, 12 and 13 designated as the $(n-2)$, $(n-1)$, $(n)$ and $(n+1)$ stages, respectively. Shift pulses are applied to these memory elements. For example, when $(n-2)$ shift pulses are applied the state of memory of the memory element 10 will become "1" while the remaining memory elements will assume "0" state. Upon arrival of $(n-1)$th pulse the memory element 11 will assume "1" state. Similarly, successive shift pulses cause the "1" state to shift successively to the succeeding stages. These shifting stages of memory provide output signals from output terminals $P_1$, $P_2$, $P_3$ and $P_4$ of the respective elements to control gates of a plurality of similar circuits thereby enabling the selection of any one of them. As the shifting state of memory is caused to advance to a particular stage corresponding to the number of input pulses such a switching circuit can be utilized as a counting circuit as well as a frequency dividing circuit of pulses.

As is well recognized by those skilled in the art the switching circuit of the type referred to above is characterized by the fact that only the memory stage immediately succeeding the memory element stage having memory state "1" can assume the state "1" in response to next pulse. To effect such a shift, the state "1" of the preceding memory element stage should condition the gate of the succeeding element to be opened in response to the succeeding input pulse.

Figure 2:
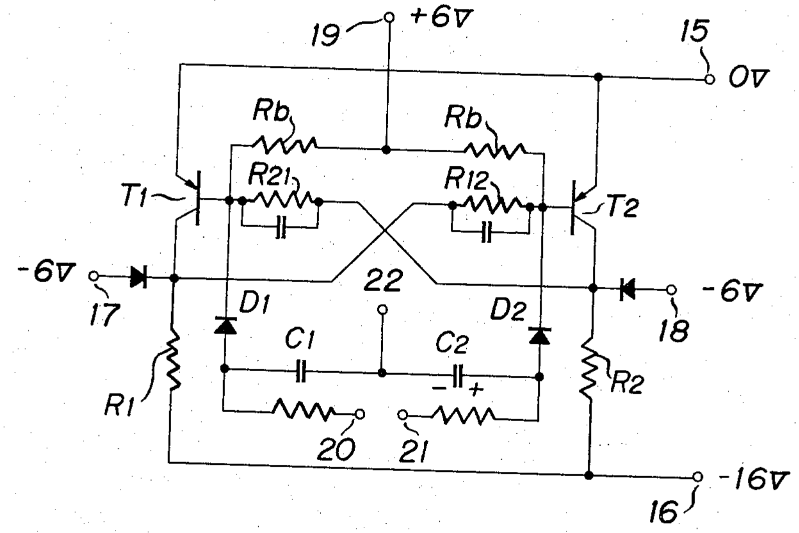
FIG. 2 PRIOR ART

Heretofore, one form of a flip-flop circuit utilizing two types of input signals comprising gate signals and shift pulse signals has been utilized as the memory element or shift register as the switching circuit as shown in FIG. 1. As shown in FIG. 2 this type of the flip-flop circuit comprises, for example, a pair of PNP transistors $T_1$ and $T_2$, condenser $C_1$, $C_2$, various resistors, diodes $D_1$, $D_2$ and other circuit components. While the operation of the flip-flop circuit shown in FIG. 2 is well known in the art, it is assumed now that when the transistor $T_1$ is nonconductive and the transistor $T_2$ is conductive, the states of memory of the whole circuit are "0" states. Then the potential impressed upon the base electrode of the transistor $T_2$ will be a negative potential in a range of zero volts and −6 volts which is determined by a potentiometer comprising a load resistor $R_1$, a coupling resistor $R_{12}$ and a base register $R_b'$ which are connected in series across a −16 v. terminal 16 and a +6 v. terminal 19, whereas the base potential of the transistor $T_1$ will be a positive potential which is determined by a potentiometer comprising the coupling resistor $R_{21}$ and another base resistor $R_b'$ which are connected in series across the +6 v. terminal 19 and a 0 v. terminal 15. Thus, the transistor $T_1$ is in its nonconductive state to maintain its collector electrode −6 v. and the transistor $T_2$ is in its conductive state to maintain its collector electrode at 0 v. Assume now that, at this time a gate terminal 20 is maintained at −6 v. while the other gate terminal 21 of 0 v. depending upon the state of the flip-flop circuit of the preceding stage. It is also assumed that a shift terminal 22 is supplied with periodically varying pulses and that the shift terminal 22 assumes 0 v. when pulses are applied thereto, whereas −6 v. when no pulse is applied. Thus the condenser $C_2$ is charged to 6 v. with the polarity indicated, in the absence of the shift pulse. However, upon application of one shift pulse upon the shift terminal 22 the potential thereof will be changed for −6 v. to 0 v. resulting in instantaneous increase to +6 v. of the positive terminal potential of the condenser $C_2$, which is applied to the base electrode of the transistor $T_2$ to quickly turn it off. When the transistor $T_2$ becomes nonconductive, its collector potential will be changed from 0 v. to −6 v. changing the base potential of the transistor $T_1$ from positive to negative. Then the transistor $T_1$ will become conductive and maintain its state stable in the same manner as above described. Thus one shift pulse applied to the shift terminal 22 causes the transistor $T_1$ to change from nonconductive to conductive state and the transistor $T_2$ from conductive to nonconductive state so as to change the state of memory of the whole circuit from "0" to "1" state. This change in the state of memory is applied to the respective gate terminals of the flip-flop circuit in the succeeding stage through output terminals 17 and 18 to prepare the flip-flop circuit to receive the next pulse.

When −6 v. and 0 v. are applied to gate terminals 20 and 21, respectively, the state of memory changes in a manner just described, but when 0 v. and −6 v. are applied respectively to the gate terminals 20 and 21, the application of an input pulse to shift terminal 22 will merely shift the base potential of the transistor $T_1$ towards positive due to the charge of the condenser $C_1$ thus causing no change in the state of memory. Accordingly, if a gate signal which renders the potential of the gate terminals 20 and 21 of the memory element of the succeeding stage to be 0 v. and −6 v., respectively, is applied to said gate terminals from a pair of output terminals of the memory element of the preceding stage, which is in set state it would be possible to reset the preceding stage and set the succeeding stage. Thus, by connecting in cascade, as shown in FIG. 1, a number of flip-flop circuits shown in FIG. 2, it is possible to construct the desired switching circuit.

As is well known in the art, the circuit shown in FIG. 2 is characterized in that a shift pulse which changes the state of the whole circuit to "0" or "1" is directly applied to the base electrodes of transistors through condensers. A digital element wherein a signal is applied to the base electrode of a transistor thereof through a condenser is advantageous in that its operating speed is very high and it is very sensitive to input signals. However it is liable to misoperate in response to noise. This is because that the condenser acts as a kind of high pass filter so that response speed and stability are not generally compatible in various electric control or regulating circuits.

While electronic computers are installed in rooms which are maintained at a constant temperature and constant humidity throughout the year, control devices therefor are usually installed in more adverse environment, e.g., where noise is caused by sparks at contacts of electromagnetic contactors and at commutators of various dynamoelectric machines, as well as where induction is caused by nearby conductors carrying large currents. As a result, the operation of any control device comprising circuit elements shown in FIG. 2 is seriously affected by such external disturbances. However, the speed of computation required by digital control devices for use in present day industrial machines is not so high as in electronic computers.

Accordingly it is the specific object of this invention to provide an improved shift register circuit which can operate with stability although at a relatively low speed.

Turning now to this invention, at first a NOR circuit employed in this invention will be considered. In FIG. 3(A) there is illustrated one example of a NOR circuit including a PNP transistor T having an emitter electrode connected to a 0 v. source, a collector electrode connected to a −16 v. source via a resistor R and a base electrode connected to a +6 v. source through a suitable resistor. As shown the base electrode is also connected to input terminals A, B, C and D respectively through resistors. With no input impressed to any one of the input terminals A, B, C and D, the transistor T is maintained nonconductive by +6 v. potential impressed upon its base electrode, whereas upon application of an input signal of sufficiently negative value to any one of these input terminals, the base electrode of the transistor T will be biased negatively to turn it conductive. Thus, the potential of an output terminal P will be −16 v. when there is no input signal or under a state of zero input. This state will be referred to "1" state. Whereas, in the presence of an input or under an input state of "1," the potential of the output terminal P will be 0 v., or "0" state. It will thus be apparent that this circuit is equivalent to a combination of an OR circuit and a NOT circuit, or to a so-called NOR circuit. For simplicity of illustration, the NOR circuit shown in FIG. 3(A) will be shown in a simple form as shown in FIG. 3(B) the other figures of the accompanying drawings. While four input terminals have been provided for the NOR circuit, the number of input terminals may be any desired number. FIG. 3(C) shows an operation table of a NOR circuit having only two input terminals.

In FIG. 4, a number of NOR circuits $Q_1$ to $Q_5$ inclusive of the general type described above are combined so that the input terminal of the circuit $Q_1$ is connected to a shift terminal S and to a gate terminal G, input terminals of circuits $Q_4$ and $Q_5$ to independent set terminals IS, another input terminal of the circuit $Q_5$ to a reset terminal R, the output terminal of the circuit $Q_2$ to an output terminal 0 and the output terminal of the circuit $Q_3$ to a reversed output terminal 10.

Figure 6:
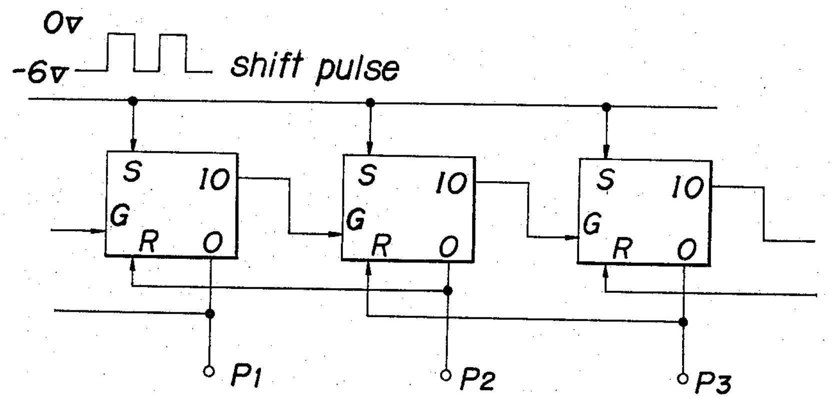
FIG. 6 shows a block diagram of a switching circuit comprising the shift register circuits shown in FIG. 4.

For simplicity, a shift register circuit of this invention comprising the combination of NOR circuits shown in FIG. 4 is symbolically depicted in the form shown in FIG. 5, and a number of these shift register circuits are connected in cascade as shown in FIG. 6 to form a switching circuit in the same manner as in FIG. 1. Although quite similar to the conventional shift register circuit, the shift register of this invention is different from it in that in the circuit of this invention the memory state is reset by feeding back a portion of the output "0" of a succeeding stage $P_2$ to the reset terminal R of the earlier stage, $P_1$, after the succeeding stage has changed to the state "1" as shown in FIG. 6.

For the sake of simplicity, the operation of the shift register circuit shown in FIG. 4 will be described by referring to an equivalent circuit shown in FIG. 7 wherein AND circuits $AND_1$ and $AND_2$ correspond to NOR circuits $Q_1$ and $Q_2$ respectively. A sign inverting circuit 24 is identical to the NOR circuit $Q_3$ while the combination of the NOR circuits $Q_4$ and $Q_5$ of FIG. 4 is represented as a memory circuit 23 in FIG. 7.

Figure 7:
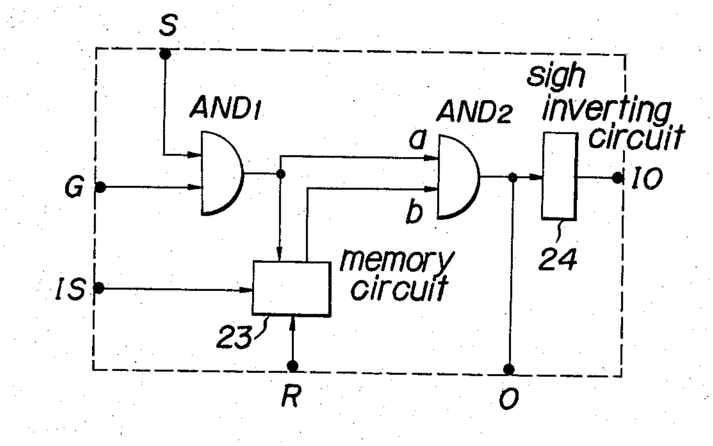
FIG. 7 shows a functional circuit diagram to explain the principle of the shift register circuit shown in FIG. 4.

Since the gate terminal G of the circuit shown in FIG. 7 is connected to the 10 terminal of the element in the preceding terminal, a signal "0" (0 v.) will be applied to the gate terminal G only when the memory state of the preceding stage is "1" to impress the signal "0" to one terminal of the AND circuit $AND_1$ whereby to prepare it to respond to an input signal to the shift terminal S. As the memory circuit 23 is held inoperative by a signal impressed upon the initial set terminal IS until an input pulse is impressed, no output will be provided. Actually being NOR circuits, the AND circuits $AND_1$ and $AND_2$ will produce outputs only when both inputs are "0". Thus, as mentioned above, since a "0" signal is applied to only one of the input terminals of the AND circuit $AND_1$ its output would also be "0" unless a shift pulse is impressed to the shift terminal S, which output will be supplied to the AND circuit $AND_2$ to cause it to provide an output "0". As a result, the reversed output terminal 10 will provide an output "1" or a potential of −6 v. which has been reversed by the sign inverting circuit 24, and is applied to a gate terminal G of the element in the succeeding element.

Upon application of an input pulse or an input signal "0" which rapidly builds up from −6 v. to 0 v. to the shift terminal S, both inputs to the AND circuit $AND_1$ will become "0" thus providing an output "1". This output signal "1" is applied to the AND circuit $AND_2$ and the memory circuit 23 which operates to store the signal "1" and to provide an output "0" which is applied to the input terminal *b* of the AND circuit $AND_2$. In this state as the signal "1" and "0" are applied to terminals *a* and *b*, respectively of the $AND_2$ circuits its output is still "0". However when the input pulse becomes −6 v. to again change the input signal to "1", the AND circuit $AND_1$ will provide an output "0". Thus both of the inputs to the AND circuit $AND_2$ are "0" thus providing an output "1" for the first time. This output "1" taken out from the terminal 0 is applied to the reset terminal R of the preceding stage so as to reset the memory circuit 24 to prevent it from providing any output thus causing the AND circuit $AND_2$ of the preceding stage to again provide an "0" output and the reversed output terminal 10 a signal "1". While this pulse is applied to the gate terminal G of the circuit shown in FIG. 7, as one of the inputs to the $AND_1$ is always "1", impression of a shift pulse would always provide an output "0", in other words, the state of the AND circuit $AND_1$ would not be affected by the input pulse. Because of the "0" output from the AND circuit $AND_1$, the AND circuit $AND_2$ will continue to provide output "1" to produce a signal "0" at the terminal 10. This output signal "0" is supplied to the gate terminal G of the next succeeding stage so as to cause the circuit elements in that stage, in response to the arrived pulse to provide an output "1" at output terminal. The removal of the pulse output "1", is effective to reset the circuit of the preceding stage to restore its output to "0" from "1", in the same manner as above mentioned.

The terminal IS serves to reset the memory circuit of the first stage at the time of starting so as to reset the succeeding stages. FIG. 8(A) shows the detail of connection of the block diagram shown in FIG. 6 and FIG. 8(B) the timing chart to explain the above mentioned operation of these shift register circuits. More particularly, as shown in FIG. 8(A), a number of shift registers shown in FIG. 4 are connected in cascade with input terminals of the respective NOR circuits comprising the shift registers designated by reference letters $A_1$, $A_2$, $A_3$ . . . $B_1$, $B_2$ . . . and $C_1$, $C_2$ . . . , the potentials at the respective terminals being shown in FIG. 8(B). As can be noted from FIG. 8(B) the shift register circuits in the respective stages will successively provide outputs each time they receive input pulses. Thus, it will be clear that these shift register circuits function and can be handled in the same manner as the conventional shift register circuits comprising flip-flop circuits and that they can be used for various applications.

For example, the shift register constructed in accordance with this invention can be utilized not only as a decimal counter circuit like the Decatron as shown in FIGS. 10(A) and 10(B) but also as a preset counter for controlling. In addition, the shift register is also effective as a pulse frequency divider which functions to decrease an input pulse frequency to $1/n$ as well as a low speed shift register. By the term "low speed shift register" or "sequencer" is meant herein a circuit wherein the register circuit is shifted by an input pulse of any width and impressed thereto at any time so as to indicate the number of pulses received by that time. Such a circuit has a wide application as a circuit to give commands regarding a sequence control of a blooming mill, selection of working steps of machine tools and other sequential operations. The shift register circuit according to this invention can also be utilized as a high speed scanner, a switching circuit and the like. In these applications the circuit may be used either as a simple switching circuit or a time division scanning circuit. FIG. 9 illustrates an application of this invention as a switching circuit wherein binary encoded and time divided pulses are transmitted over a conductor 30 or a channel. In order to divide these pulses into four bits of 1, 2, 4 and 8 to distribute them among parallel connected memory circuits $M_1$, $M_2$, $M_3$ and $M_4$, four shift register circuits 1, 2, 3 and 4 are connected in cascade to be impressed with pulses from a shift pulse oscillator 31 to provide outputs adapted to actuate the respective gate circuits $G_1$, $G_2$, $G_3$ and $G_4$. In this arrangement as the gate circuits $G_1$, $G_2$, $G_3$ and $G_4$ operate to open in response to output pulses from the shift register circuits 1, 2, 3 and 4 to pass the time divided pulses which are transmitted over the conductor 30, it is clear that it is only required to sequentially open the gate circuits $G_1$ to $G_4$ in synchronism with the binary pulses by the outputs from the shift registers 1 to 4 inclusive. As described before as the shift register 1 to 4 produce sequential outputs in response to the shift pulses it is only required to synchronize the oscillation frequency of the shift pulse oscillator 31 with the binary pulse in order to properly distribute the binary pulses. It was found that adequate distribution can be effected by interposing a time interval of at least ten microseconds between adjacent bits of the binary pulse signal. Input signals may be a series of signals transmitted successively over a single information channel, from a tape reader, a tape recorder or a magnetostrictive delay line and the like. FIG. 9 illustrates an application of this invention to write these signals in parallel connected buffers, storages and the like.

On the contrary, when it is desired to transmit over a single channel by time division scheme parallel information such as that coming from a dial setting pulse, a push button panel, a program setting pin board and the like, a transmitting apparatus must be provided for the receiving apparatus shown in FIG. 9. Thus, a so-called time division technique must be employed as shown in FIG. 14 wherein informations from memory circuits $M_1'$ to $M_4'$ inclusive on the transmitter end are transmitted over a conductor 30 comprising a single channel to be distributed among a number of memory circuits on the receiver side. However the shift register according to this invention can not be directly applied to the system shown in FIG. 14. This is because that there are overlapping portions between outputs of the respective stages as shown in FIG. 10(B) for the purpose of resetting the *n*th stage by the output from $(n+1)$th stage as best shown by the block diagram shown in FIG. 6. As illustrated by an enlarged view of FIG. 11, the period of overlapping between outputs is about 3 to 5 microseconds. If scanning is effected by these overlapped outputs, it would become impossible to effect correct time division of adjacent two bits. To solve this problem, according to this invention a NOR circuit $Q_6$ is added to invert the output from the NOR circuit $Q_1$ as shown in FIG. 12 with components designated by the same reference characters as in FIG. 4. While the shift register circuit shown in FIG. 12 operates in the same manner as that shown in FIG. 4, an output appearing at an output D will provide on output having the same width as the input pulse only when it is impressed upon the terminal S as shown in FIG. 13. A terminal 0 will provide an overlapped outputs similar to FIG. 4. When four shift register circuits shown in FIG. 12, are connected in cascade 1, 2, 3, 4 as shown in FIG. 14 to be energized by a carrier oscillator 31 they operate not only as registers but also generate sequential signals in synchronism with carrier pulses or shift pulses. Moreover, as they cause gate circuits $G_1$ to $G_4$ and $G_1'$ to $G_4'$ inclusive to open, they can also act as scanner circuits. As a result of experiment wherein the circuit shown in FIG. 14 was employed for both scanning and distribution it was found that information could be positively transmitted up to a carrier frequency of about 50 kc. By employing a carrier frequency of about 50 kc. transmission of signals comprising from several hundreds to several thousands bits can be completed within a transmission time ranging from a few to 100 milliseconds which is sufficient for control purposes.

As can be noted from the foregoing description regarding preferable embodiments, as the shift register circuit of this invention comprises solely low speed NOR circuits without using any capacitors or condenser they are advantageous in that they operate with great stability and are economic to construct since the number of NOR circuits required is few. The circuit construction is simple because it comprises a required number of identical shift register circuits connected in cascade. Accordingly the shift register circuits of this invention can be advantageously employed in digital control circuit devices for use in various industrial machines including rolling mills, machine tools and the like.

While the invention has been shown and described in connection with some preferred embodiments thereof, it should be understoood that this invention is not limited thereto but includes any modifications and alterations as fall within the true spirit and scope of this invention as defined in the appended claims.

What we claim as new and desire to secure by Letters Patent of the United States is:

1. A shift register circuit with stages, each stage of said shift register having a shift terminal which is connected to a source of a binary shifting signal, a gate terminal, first and second independent set terminals, each set terminal being used for applying an initial set signal, a reset terminal, a forward output terminal, a feedback output terminal; a first NOR circuit element having first and second input sides and an output side; a second NOR circuit element having first and second input sides and an output side; a third NOR circuit element having an input side and an output side; a fourth NOR circuit element having first, second and third input sides and an output side; a fifth NOR circuit element having first, second and third input sides and an output side; the first input side of said first element being connected to said shift terminal the second input side of said first element being connected to said gate terminal which in turn is connected to the forward output terminal of the preceding stage, the output side of said first element being connected to the first input side of said second element and of said fourth element, the second input side of said second element being connected to a connection point between the output side of said fourth element and the first input side of said fifth element, the output side of said second element being connected to the input side of said third element and to the feedback output terminal which in turn is connected to the reset terminal of the preceding stage, the output side of said third element being connected to said forward output terminal which is in turn connected to the gate terminal of the succeeding stage, the second input side of said fourth element being connected to said first independent set terminal, the third input side of said fourth element being connected to the output side of said fifth element, the second input side of said fifth element being connected to said second independent set terminal, the third input side of said fifth element being connected to said reset terminal which in turn is connected to a feedback output terminal of said succeeding stage.

2. A shift register circuit according to claim 1, each stage of said shift register further having a second feedback output terminal and a sixth NOR circuit element having an input side and an output side, the input side of said sixth NOR circuit element being connected to the connection point between the output side of said first NOR circuit element and the first input side of said second NOR circuit element and said output side being connected to said second feedback output terminal.

References Cited

UNITED STATES PATENTS

| | | | |
|---|---|---|---|
| 2,985,773 | 5/1961 | Dobbie | 307—88.5 |
| 3,079,513 | 2/1963 | Yokelson | 307—88.5 |
| 3,083,305 | 3/1963 | Maley | 307—88.5 |
| 3,107,306 | 10/1963 | Dobbie | 307—88.5 |
| 3,139,540 | 6/1964 | Osborne | 307—88.5 |
| 3,183,369 | 5/1965 | Lauer | 307—88.5 |

ARTHUR GAUSS, *Primary Examiner.*

S. D. MILLER, *Assistant Examiner.*